3,763,086
COLORED ORGANIC POLYANHYDRIDE POLYMERS

Gregoire Kalopissis and Andre Viout, Paris, France, assignors to Societe Anonyme dite: L'Oreal, Paris, France
No Drawing. Continuation-in-part of application Ser. No. 576,811, Sept. 2, 1966, now Patent No. 3,597,468. This application Apr. 5, 1971, Ser. No. 131,457
Claims priority, application Luxembourg, Sept. 6, 1965, 49,441; Jan. 10, 1966, 50,228; June 14, 1966, 51,325; June 16, 1966, 51,345
Int. Cl. A11k 7/12; A61k 7/12
U.S. Cl. 260—41 C                 13 Claims

ABSTRACT OF THE DISCLOSURE

A colored polymer comprises an organic acid polyanhydride having condensed on the anhydride functions thereof an amine dye and a lower alkanol.

---

This application is a continuation-in-part of my earlier application Ser. No. 576,811, filed Sept. 2, 1966, now Pat. No. 3,597,468.

Resins in alcoholic or aqueous alcoholic solutions are ingredients conventionally employed in hair lacquers and hair setting lotions. Most of the lacquers or setting lotions presently in use are transparent and are used to hold the hair in place and to impart thereto various characteristics without trying to change the color of the hair.

It has, however, already been suggested that hair lacquers or setting lotions be used to color the hair. Attempts have accordingly been made to introduce soluble dyes into solutions of the resins used to prepare such lacquers or lotions, but the results have not been satisfactory because the dye is not retained by the resin and such products tend to stain not only the skin and hands of those who use such products, but also clothing coming into contact therewith.

In order to mitigate these difficulties, it has been suggested that hair lacquers or setting lotions be made from colored polymers obtained by copolymerization of a colored monomer and a colorless monomer or that they be made by chemically combining a resin with a dye capable of durably coloring the resin.

In particular, it has already been suggested by one of the applicants that colored polymers be made comprising amide groups, the nitrogenized portion of which comprises aromatic diamine dyes.

However, these colored polymers have not proven entirely satisfactory for use in making hair lacquers and setting lotions because of certain inherent disadvantages.

In the first place, the bonding of the dye to the resin or the monomer which is a constituent of the resin weakens or undesirably alters the shade of the dye.

Even more importantly, the various colored resins heretofore proposed have inadequate cosmetic qualities as compared with those of the colorless resins presently in use.

It is known that resins to be used in hair lacquers and setting lotions must have certain contradictory qualities which are difficult to reconcile.

In the first place, the resins used must be soluble in an alcoholic or aqueous alcoholic medium, so that they can be applied and easily removed by shampooing. On the other hand, they must have an excellent resistance to humidity so that they do not impart an unattractive sticky appearance to the hair.

Moreover, the resins must be highly transparent and durable, so as to impart lustre to the hair. They must also be easily removed by simple brushing of the hair, without having any tendency to scale off or crumble when the hair is subjected to the bending and twisting normal in day-to-day living.

It is also well known to condense alcohols on polymers obtained by copolymerizing maleic anhydride and an unsaturated monomer in order to produce colorless hair lacquers.

It is furthermore known that dyes can be condensed on such polymers in order to produce colored pigments which are particularly useful in the field of color photography.

However, it should be noted that it is impossible to obtain colored polymers suitable for cosmetic use by mixing such colorless resins and those colored polymers which have been developed for use in photography, because a mixture of such polymers is not soluble in the alcoholic or aqueous alcoholic solutions which are used in cosmetology, even when the percentage of colored polymers is relatively small.

The present invention relates to colored polymers having characteristics which permit their use in hair lacquers and hair setting lotions. Their cosmetic properties are comparable to those of the better colorless lacquers presently on the market and the dye is combined without having any adverse effect on the qualities of the supporting polymer.

More particularly, the present invention relates to a polymer comprising a semi-ester, semi-amide of (1) an organic acid polyanhydride selected from the group consisting of poly(maleic anhydride), poly(itaconic anhydride), poly(acrylic anhydride), poly(methacrylic anhydride) and poly(mixed acrylic/methacrylic anhydride), (2) a dye selected from the group consisting of azo, anthraquinone and benzene dyes containing an extra-nuclear radical having the formula

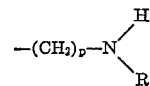

wherein R is selected from the group consisting of hydrogen, —$CH_3$ and —$C_2H_5$ and $p$ is 2–6, said extra-nuclear radical being bonded to the aromatic nucleus of the dye through a nitrogen atom directly attached to said aromatic nucleus and said dye being bonded to the anhydride functions of the organic acid polyanhydride by an amide bond through the terminal nitrogen atom of said extra-nuclear radical, the quantity of said dye combined with said polymer by amidification ranging between 68.4–100% of theoretical, and (3) an alcohol selected from the group consisting of butanol and ethanol, said alcohol being bonded to dye-free anhydride functions of the organic acid polyanhydride, 2–25% of said anhydride function being condenses with said dye.

The novel colored polymers of the present invention are characterized by the fact that they can be manufactured with a high degree of consistency in their physical characteristics and colors, and that they have a particularly strong coloring effect since it is possible to attach a notably higher number of molecules of dye to the structural chain of the polymer than is the case with those colored polymers known up to the present time.

Due to this fact, the colored polymers of the present invention can be used very advantageously when mixed with colorless polymers which are chosen for their good cosmetic quality, so as to impart to these colorless polymers a particular coloration. Because of the intensity of the coloring effect obtained with the polymers of this invention, the addition of small quantities thereof to colorless polymers is sufficient to produce the desired coloring effect without impairing the cosmetic qualities of the latter polymers.

The term "colored homopolymer" is used in the present description to designate a homopolymer to which one or more dyes have been attached at certain places while one or more alcohols have been attached at other places. In other words, the expression "colored homopolymer" signifies that the resulting polymer has been obtained from a homopolymer but not necessarily that the colored polymer taken as a chemical entity is itself a homopolymer, that is, that all its monomeric units are identical.

The colored polymers of the present invention can be prepared by condensing one or more of the above defined dyes and alcohols on the homopolymer in a reaction medium comprising an organic solvent such as dioxane or a ketone, at a temperature corresponding essentially to the boiling point of the solvent selected, for a time ranging generally between 2-24 hours. The resulting colored homopolymer is precipitated from the reaction medium by, for example, petroleum ether. The order in which the condensation of the dye and alcohol on the homopolymer is carried out can vary. For example, the dye can initially be condensed thereon followed by condensation of the alcohol thereon. It is also possible to first condense part of the alcohol on the homopolymer, then the dye, and finally the remainder of the alcohol. Further, it is possible to condense the alcohol and dye simultaneously on the homopolymer.

The homopolymers employed to produce the colored polymers of this invention are selected from the group consisting of poly(maleic anhydride) having a molecular weight ranging from about 2,000 to about 14,000, poly(itaconic anhydride) having a molecular weight ranging from about 2,000 to about 12,000, poly(acrylic anhydride) having a molecular weight ranging from about 4,000 to about 20,000, poly(methacrylic anhydride) having a molecular weight ranging from about 3,000 to about 15,000 and a poly(mixed acrylic/methacrylic anhydride) having a molecular weight ranging from about 2,000 to about 15,000.

The dyes employed in the present invention are selected from the group consisting of azo, benzene and anthraquinone dyes containing an extra-nuclear radical having the formula $$-(CH_2)_p-N\begin{matrix}H\\R\end{matrix}$$

wherein R is selected from the group consisting of hydrogen, $-CH_3$ and $-C_2H_5$ and p is 2-6, the extra-nuclear radical being bonded to the aromatic nucleus of the dye through a nitrogen atom directly attached to said aromatic nucleus and said dye being bonded to the anhydride function of the polymer by an amide bond through the terminal nitrogen atom of said extra-nuclear radical, the quantity of dye combined with said polymer by amidification ranging between 68.4–100% of theoretical, 2–25% of the anhydride functions of the polymer being condensed with the dye.

Representative benzene dyes include those having the formula:

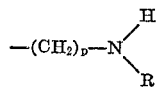

wherein R has the meaning given above, $R_1$ is selected from the group consisting of hydrogen and lower alkyl having 1-4 carbon atoms, $R_2$ represents a member selected from the group consisting of hydrogen and $$-N\begin{matrix}R_1\\R_1\end{matrix}$$

wherein $R_1$ has the meaning given above and $R_3$ represents a member selected from the group consisting of hydrogen, lower alkyl having 1-4 carbon atoms and lower alkoxy having 1-4 carbon atoms.

Representative anthraquinone dyes include those having the formula:

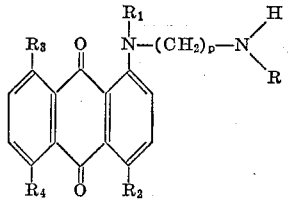

wherein:

p is 2–6,

R is selected from the group consisting of hydrogen, $-CH_3$ and $-C_2H_5$, $R_1$ is selected from the group consisting of hydrogen and lower alkyl having 1-4 carbon atoms, $R_2$ is selected from the group consisting of hydrogen and $-NH-CH_3$ and $R_3$ and $R_4$ are selected from the group consisting of hydrogen and amino.

Representative azo dyes include those having the formula:

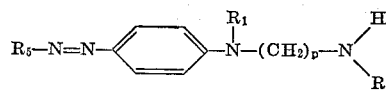

wherein R and $R_1$ have the meaning given above and $R_5$ is selected from the group consisting of

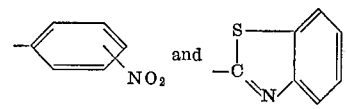

Illustrative of specific benzene, azo and anthraquinone dyes usefully employed in the present invention are the following:

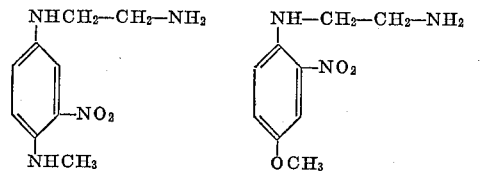

(a)            (b)

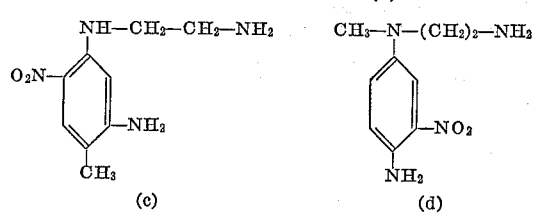

(c)            (d)

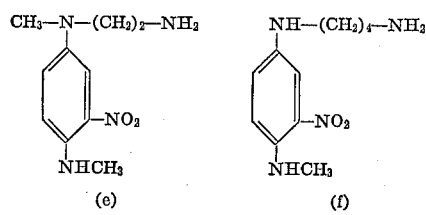

(e)            (f)

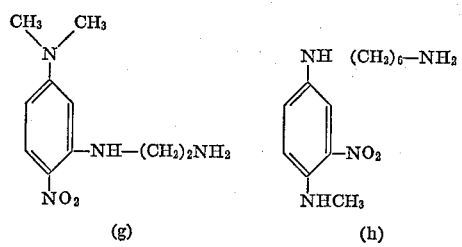

(g)            (h)

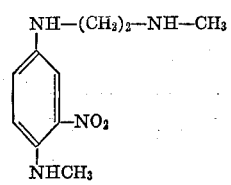
(i)

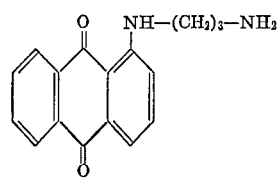
(j)

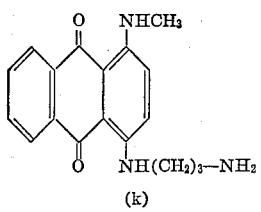
(k)

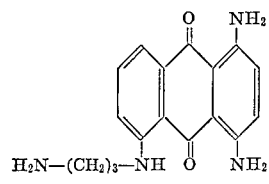
l

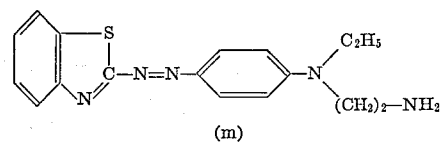
(m)

(n)
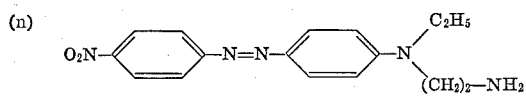

and (o)
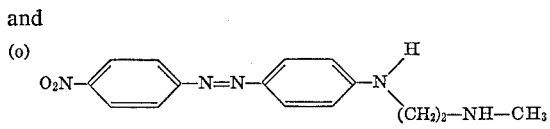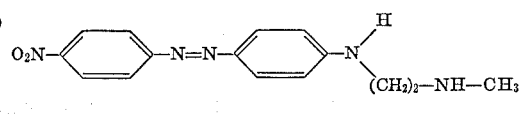

The alcohol condensed on the homopolymer can be a lower alkanol having 1-4 carbon atoms. Preferably ethanol and butanol are employed and it will be recognized that one or more alcohols as well as one or more dyes can be condensed on the homopolymer. The alcohol is employed in amounts sufficient to condense the remaining dye-free anhydride functions of the homopolymer.

The following examples are provided to illustrate the invention.

EXAMPLE 1

Preparation of a colored mixed semi-ester semi-amide polymer by condensing on poly(maleic anhydride) both n-butyl alcohol and a dye having the formula:

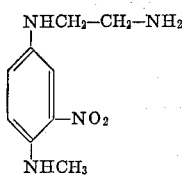

300 ml. of anhydrous dioxane, 29.4 g. (0.3 mol) of poly(maleic anhydride) having a molecular weight of 4,000, 6.3 g. (0.03 mol) of a dye having the above formula and 20 g. (0.27 mol) of n-butanol are placed in a flask equipped with agitating means, a thermometer and a reflux condenser. This mixture is heated to reflux for 10 hours. Esterification is completed by adding 22.2 g. (0.3 mol) of n-butanol and again heating to reflux for 7 hours.

The colored copolymer is then precipitated with petroleum ether. Drying yields 83% by weight of a violet powder which is soluble in alcohol and in an aqueous alcohol (ethanol) solution.

Analysis shows that the quantity of dye combined with the polymer by amidification is 82% of that theoretically possible.

EXAMPLE 2

Preparation of a colored mixed semi-ester semiamide polymer by condensing on poly(itaconic anhydride) both n-butyl alcohol and a dye having the formula:

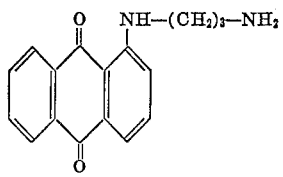

33.6 g. (0.3 mol) of poly(itaconic anhydride) having a molecular weight of 3,000, 200 g. of anhydrous dioxane, 4.2 g. (0.015 mol) of dye having the above formula and 21 g. (0.285 mol) of n-butanol are placed in a flask equipped with agitating means, a thermometer and a reflux condenser. The mixture is heated to reflux for 15 hours. The esterification is completed by addition of 22.2 g. (0.3 mol-g.) of n-butanol and it is again heated to reflux for 7 hours.

The colored copolymer is then precipitated with petroleum ether. Drying yields 79.5% by weight of a red powder, which is soluble in alcohol and in an aqueous alcohol (ethanol or isopropanol) solution.

It is found by analysis that 100 percent of the theoretically possible quantity of dye is bonded to the polymer by amidification.

EXAMPLE 3

Preparation of a colored mixed semi-ester semiamide polymer by condensing on poly(acrylic anhydride) both n-butyl alcohol and a dye having the formula:

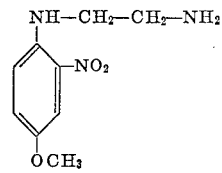

37.8 g. (0.3 mol-g.) of poly(acrylic anhydride) having a molecular weight of 14,000, 200 g. of anhydrous dioxane, 3.165 g. (0.015 mol-g.) of dye having the above formula and 21 g. (0.285 mol-g.) of n-butanol are placed in a flask equipped with agitating means, a thermometer and a reflux condenser.

The mixture is heated to reflux for 12 hours. Esterification is completed by the addition of 22.2 g. (0.3 mol-g.) of n-butanol and it is again heated to reflux for 8 hours.

The colored copolymer is then precipitated with petroleum ether. After drying, an orange-yellow powder is obtained. The yield is 82% by weight. This powder is soluble in alcohol, for instance, ethanol and isopropanol, and in an aqueous alcohol mixture.

It is found by analysis that the quantity of dye bonded to the polymer by amidification is 100% of that theoretically possible.

EXAMPLE 4

Preparation of a colored mixed semi-ester semi-amide polymer by condensing on poly(methacrylic anhydride) both n-butyl alcohol and a dye having the formula:

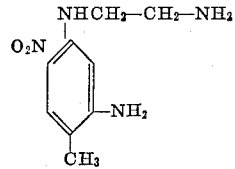

46 g. (0.3 mol-g.) of poly(methacrylic anhydride) having a molecular weight of 7,100, 200 g. of anhydrous dioxane, 3.15 g. (0.015 mol-g.) of a dye having the above formula and 21 g. (0.285 mol-g.) of n-butanol are placed in a flask equipped with agitating means, a thermometer and a reflux condenser.

The mixture is heated to reflux for 15 hours. Esterification is completed by adding 22.2 g. (0.3 mol-g.) of n-butanol and it is again heated to reflux for 7 hours.

The colored copolymer is then precipitated with petroleum ether. After drying, the yield is 71.5% by weight of a yellow powder which is soluble in a lower alkanol such as ethanol or isopropanol and in an aqueous alcohol solution.

It is found by analysis that the quantity of dye bonded to the polymer by amidification is 100% of that theoretically possible.

EXAMPLE 5

Preparation of a colored mixed semi-ester semi-amide polymer by condensing on a poly(mixed acrylic/methacrylic anhydride) both n-butyl alcohol and a dye having the formula:

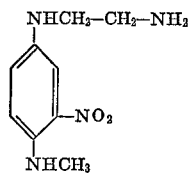

42 g. (0.3 mol) of poly(mixed acrylic/methacrylic anhydride) having a molecular weight of 6,500, 200 g. of dioxane, 3.15 g. (0.015 mol) of a dye having the above formula and 21 g. (0.285 mol) of n-butanol are placed in a flask equipped with agitating means, a thermometer and a reflux condenser.

The mixture is heated to reflux for 15 hours. Esterification is completed by the addition of 22.2 g. (0.3 mol) of n-butanol and it is again heated to reflux for 7 hours.

The colored copolymer is then precipitated with petroleum ether. Drying yields 76 % by weight of a red violet powder which is soluble in an alcohol such as ethanol or isopropanol and in an aqueous alcohol solution.

It is found by analysis that the quantity of dye bonded to the polymer by amidification is 68.4% of that theoretically possible.

Examples 1–5 which illustrate the use of dyes (a), (b), (c) and (k) above are repeated using instead the remaining listed dyes with equally favorable results. Further, rather than using n-butanol for condensation on the homopolymer, other lower alkanols, such as ethanol and propanol, are also employed.

The following examples are given to illustrate that the polymers produced by the present invention are usefully employed in the preparation of cosmetics such as hair setting lotions.

EXAMPLE 6

A hair setting lotion is prepared by mixing together:

Polymer obtained as in Example 1 _____g__ 2
2-amino 2-methyl-1-propanol, q.s.p. _____pH__ 8.5
Ethyl alcohol, q.s.p. _____degrees__ 50
Water, q.s.p. _____ml__ 100

This solution is applied to brown hair which has previously been shampooed and the hair is set in the usual manner. When the hair is dried and arranged it has a violine mahogany shade.

EXAMPLE 7

A hair setting lotion is prepared by admixing:

Polymer obtained as in Example 3 _____g__ 1.3
Polymer obtained as in Example 2 _____g__ 0.7
2-amino-2-methyl-1-propanol, q.s.p. _____pH__ 8
Ethyl alcohol, q.s.p. _____degrees__ 50
Water, q.s.p. _____ml__ 100

This lotion is applied to chestnut or blond hair which has been dampened and dried and the hair is then set in the usual manner.

After drying the hair shines and has golden glints.

EXAMPLE 8

A hair setting lotion is prepared by mixing together:

Polymer obtained as in Example 5 _____g__ 0.8
Polymer obtained as in Example 3 _____g__ 0.2
Gantrez AN 3953 (half butyl ester of Gantrez AN 119 which is methyl vinyl ether maleic anhydride copolymer having a specific viscosity of 0.1–0.5 in a 1% solution of the copolymer in methyl ethyl ketone at 25° C.) _____g__ 1.5
2-amino-2-methyl-1-propanol, q.s.p. _____pH__ 8
Ethyl alcohol, q.s.p. _____degrees__ 50
Water, q.s.p. _____ml__ 100

This solution is applied to natural warm chestnut hair and the hair is then set. After drying, the hair is strong and shining with mahogany glints.

Essentially similar hair setting lotions are prepared using polymers produced with the other dyes and alcohols defined above.

What is claimed is:

1. A polymer comprising a semi-ester, semi-amide of (1) an organic acid polyanhydride selected from the group consisting of poly(maleic anhydride), poly(itaconic anhydride), poly(acrylic anhydride), poly(methacrylic anhydride) and poly(mixed acrylic/methacrylic anhydride), (2) a dye selected from the group consisting of azo, anthraquinone and benzene dyes containing an extra-nuclear radical having the formula

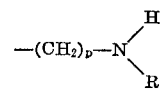

wherein R is selected from the group consisting of hydrogen, —CH$_3$ and —C$_2$H$_5$ and $p$ is 2–6, said extra-nuclear radical being bonded to the aromatic nucleus of said dye through a nitrogen atom directly attached to said aromatic nucleus and said dye being bonded to the anhydride function of the organic acid polyanhydride by an amide bond through the terminal nitrogen atom of said extra-nuclear radical, the quantity of said dye combined with said polymer by amidification ranging between 68.4–100% of theoretical, and (3) a lower alkanol bonded to dye-free anhydride functions of the organic acid polyanhydride, 2–25% of said anhydride functions being condensed with said dye.

2. The polymer of claim 1 wherein said lower alkanol is selected from the group consisting of ethanol and butanol.

3. The polymer of claim 1 wherein said dye is a benzene dye having the formula:

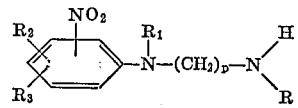

wherein
R is selected from the group consisting of hydrogen, —CH$_3$ and —C$_2$H$_5$,
$p$ is 2–6,
R$_1$ is selected from the group consisting of hydrogen and lower alkyl having 1–4 carbon atoms,
R$_2$ is selected from the group consisting of hydrogen and

wherein R$_1$ has the meaning given above, and
R$_3$ is selected from the group consisting of hydrogen, lower alkyl having 1–4 carbon atoms and lower alkoxy having 1–4 carbon atoms.

4. The polymer of claim 3 wherein said benzene dye has a formula selected from the group consisting of

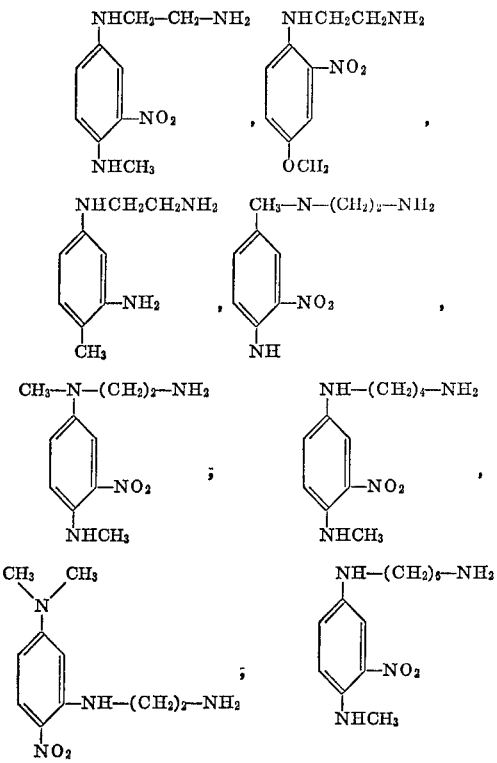

and

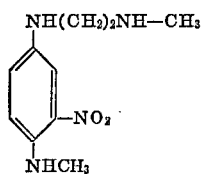

5. The polymer of claim 1 wherein said dye is an anthraquinone dye having the formula:

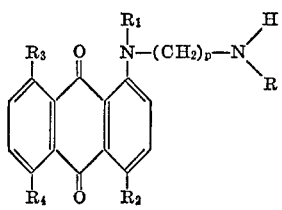

wherein:
p is 2–6,
R is selected from the group consisting of hydrogen, —CH$_3$ and —C$_2$H$_5$,
R$_1$ is selected from the group consisting of hydrogen and lower alkyl having 1–4 carbon atoms,
R$_2$ is selected from the group consisting of hydrogen and —NH—CH$_3$, and
R$_3$ and R$_4$ are selected from the group consisting of hydrogen and amino.

6. The polymer of claim 5 wherein said anthraquinone dye has a formula selected from the group consisting of:

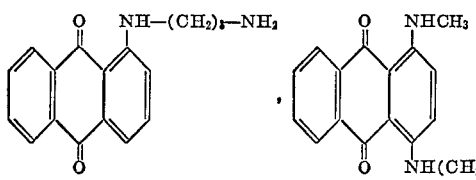

and

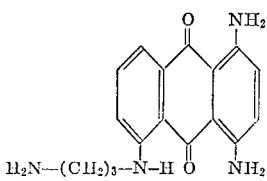

7. The polymer of claim 1 wherein said dye is an azo dye having the formula:

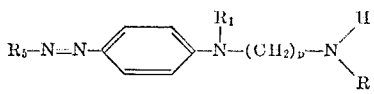

wherein
R is selected from the group consisting of hydrogen, —CH$_3$ and —C$_2$H$_5$,
p is 2–6,
R$_1$ is selected from the group consisting of hydrogen and lower alkyl having 1–4 carbon atoms, and
R$_5$ is selected from the group consisting of

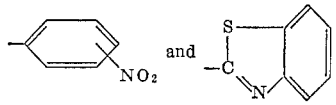

8. The polymer of claim 7 wherein said azo dye has a formula selected from the group consisting of

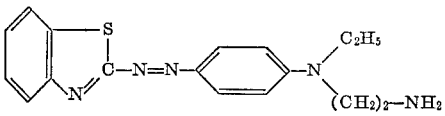

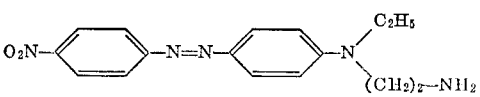

and

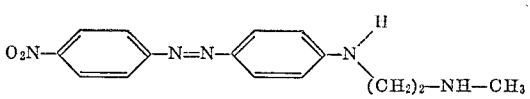

9. The polymer of claim 1 wherein said organic acid anhydride is poly(maleic anhydride) having a molecular weight ranging from about 2,000 to about 14,000.

10. The polymer of claim 1 wherein said organic acid anhydride is poly(itaconic anhydride) having a molecular weight ranging from about 2,000 to about 12,000.

11. The polymer of claim 1 wherein said organic acid anhydride is poly(acrylic anhydride) having a molecular weight ranging from about 4,000 to about 20,000.

12. The polymer of claim 1 wherein said organic acid anhydride is poly(methacrylic anhydride) having a molecular weight ranging from about 3,000 to about 15,000.

13. The polymer of claim 1 wherein said organic acid anhydride is poly(mixed acrylic/methacrylic anhydride) having a molecular weight ranging from about 2,000 to about 15,000.

References Cited
UNITED STATES PATENTS

| | | | |
|---|---|---|---|
| 3,597,468 | 8/1971 | Kalopissis | 260—465 D |
| 3,619,101 | 11/1971 | Kalopissis | 8—10.1 |
| 3,617,165 | 10/1971 | Kalopissis | 8—10.1 |
| 3,619,106 | 11/1971 | Kalopissis | 8—31 |

ALLAN LIEBERMAN, Primary Examiner

R. ZAITLEN, Assistant Examiner

U.S. Cl. X.R.

8—10.1; 260—78.5, 562, 573

UNITED STATES PATENT OFFICE
CERTIFICATE OF CORRECTION

Patent No. 3,763,086          Dated October 2, 1973

Inventor(s) Gregoire Kalopissis and Andre Viout

It is certified that error appears in the above-identified patent and that said Letters Patent are hereby corrected as shown below:

Column 9, between lines 10-18, the structural formulae should read --

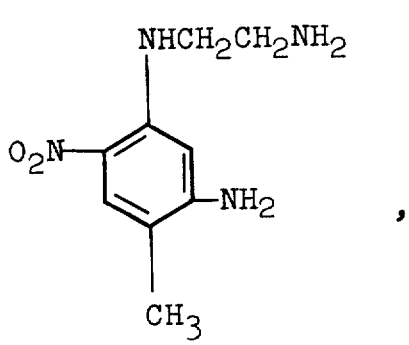 , 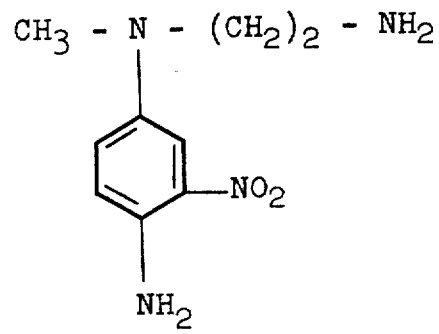

Signed and sealed this 23rd day of April 1974.

(SEAL)
Attest:

EDWARD M. FLETCHER, JR.
Attesting Officer

C. MARSHALL DANN
Commissioner of Patents